R. C. TOMPKINS.
Machine for Scraping Hogs.
No. 214,731. Patented April 22, 1879.
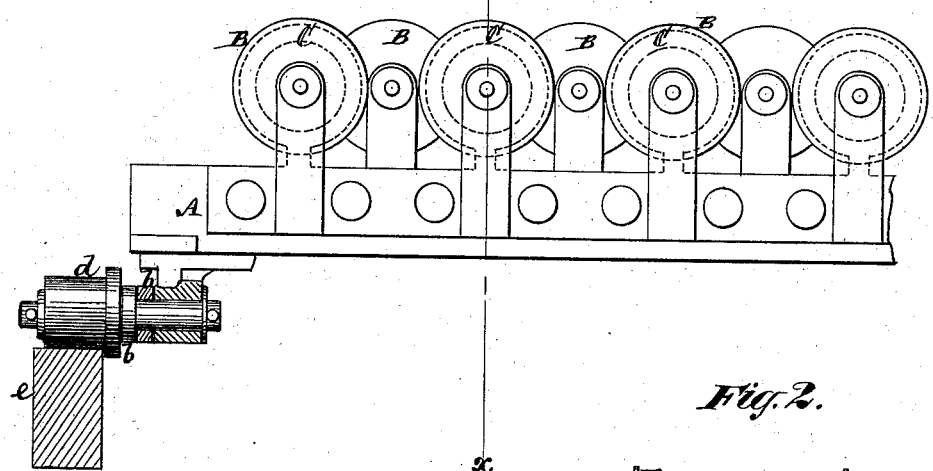
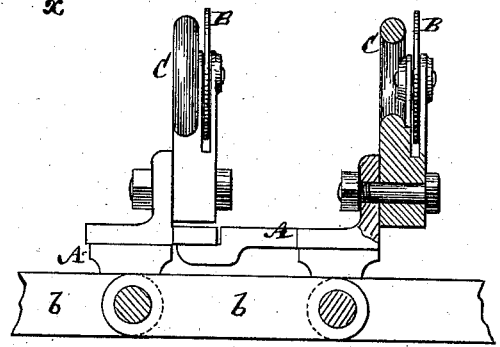
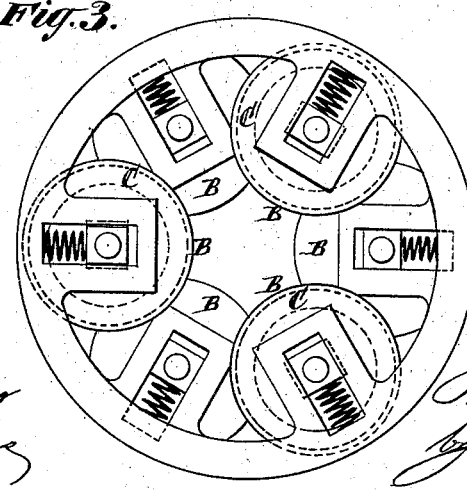

UNITED STATES PATENT OFFICE.

RHINELANDER C. TOMPKINS, OF NEW YORK, ASSIGNOR OF ONE-HALF HIS RIGHT TO AMASA SPRING, OF WHITE PLAINS, NEW YORK.

IMPROVEMENT IN MACHINES FOR SCRAPING HOGS.

Specification forming part of Letters Patent No. 214,731, dated April 22, 1879; application filed January 18, 1879.

*To all whom it may concern:*

Be it known that I, RHINELANDER C. TOMPKINS, of the city and State of New York, have invented certain new and useful Improvements in Machines for Scraping Hogs, of which the following is a full, clear, and exact description, reference being had to the accompanying drawings, forming part of this specification.

This invention relates to machines for dressing hogs or scraping the bristles from them after slaughtering, in which a series of moving scrapers are employed, including machines in which an endless chain of scrapers or scraping-blades are used, substantially as described in Letters Patent issued to me on November 11, 1873, and October 16, 1877, and in which the hog is rolled or turned over backward and forward laterally, while the scraping blades or tools on which the carcass rests travel in direction of its length; and the invention will here be described more particularly with reference to such a machine, but it is not restricted thereto.

The invention consists in the use, in machines for scraping hogs, of a series of circular scrapers, each made capable of revolving automatically on its own axis. These scrapers or scraping-blades not only readily conform to prominences of the carcass, but, by their automatic rotation as the carcass passes over or against them, are made to continually present new scraping-surfaces.

The invention also consists in a combination, with automatically and independently rotating circular scraping-blades, of fenders conforming in configuration to said blades for support or adjustment of the carcass relatively to said blades, to prevent the latter from cutting into the skin and flesh.

In the accompanying drawings, Figure 1 represents a sectional end elevation of a portion of a machine for scraping hogs, in which my improved scrapers are carried by an endless traveling chain or platform, and Fig. 2 a partly sectional side elevation of the same on the line $x\ x$. Fig. 3 is an end or plan view of a modification in which the scrapers are cylindrically arranged outside of an opening or passage, through which the carcasses are passed.

Referring, in the first instance, to Figs. 1 and 2 of the drawings, A A are connecting-slats of an endless chain, which is of any suitable length and width; $b\ b$, the side links of the chain, having rollers $d$, which run upon or over stationary side pieces $e$ of the frame. This endless chain or platform may be supported on end drums, and be driven to travel in direction of its length, substantially as described in my two Letters Patent, hereinbefore referred to, for the purpose of scraping the bristles from the carcass as it is laid upon a series of scrapers with which said chain is provided or studded, the hog being suitably held and rolled or turned as the scrapers pass under it. Instead, however, of using scrapers or scraping-blades fixedly attached to the traveling endless chain, as in the machines hereinbefore referred to, I employ and suitably mount upon said traveling chain or platform a series of circular scraping-blades, B, hung so as to be capable of independent rotation about their axes in planes which are transverse to the direction in travel or length of the platform. These revolving circular scrapers, on which the hog to be scraped is placed, suitably held and rolled or manipulated laterally, are arranged at suitable distances apart, and otherwise suitably disposed to act successively upon the various portions of the carcass, as in the machines I have hereinbefore referred to. By their circular construction and free motion, however, about or around their axes, they not only conform to prominences of the carcass, so as to act over the whole surface of the latter or greater portion thereof, but are automatically revolved by their contact with the carcass, whereby they are made to continuously present fresh scraping-surfaces, and so effect a more perfect scraping action on the hog.

To prevent these automatically-revolving circular scrapers B from cutting into the skin or flesh of the hog, the traveling platform which carries the scrapers, has also mounted on it, alongside of each circular scraper, fenders C, constructed to conform to the circular scrapers, but so that the latter project sufficiently above or beyond the fenders to provide for their removing the bristles while the carcass is supported by the fenders, or prevented from dropping so low as to allow of the scrapers cutting into the skin or flesh.

Instead of the automatically-revolving circular scrapers and their fenders being attached to a traveling endless apron, chain, or platform, they might be placed on the outside of a revolving drum, or they might be arranged, as represented in Fig. 3, on the inside of a cylinder, for the passage of the carcass through or between them. When, however, arranged as in Fig. 3, springs or weights should be applied to their bearings, to give them a yielding radial action relatively to the cylinder, or the scrapers and their fenders may be attached to the inner ends of inclined weighted arms, arranged at suitable distances apart around the cylinder and exerting a tendency to bring the scrapers toward each other in the central portion of the cylinder.

I claim—

1. In a hog-scraping machine, a series of circular scrapers, each capable of revolving automatically on its own axis, arranged substantially as described.

2. The combination of a circular rotating scraper, B, with the circular fender C, as and for the purpose herein set forth.

3. The combination of the series of circular rotating scrapers B and circular fenders C, all arranged, as described, in relation to each other, as and for the purpose set forth.

R. C. TOMPKINS.

Witnesses:
T. J. KEANE,
FRED. HAYNES.